United States Patent
Breideband et al.

(10) Patent No.: US 11,215,302 B2
(45) Date of Patent: Jan. 4, 2022

(54) POSITIONING DEVICE FOR A SPRING CLAMP

(71) Applicant: NORMA Germany GmbH, Maintal (DE)

(72) Inventors: Linda Breideband, Frankfurt am Main (DE); Michael Sommer, Büdingen (DE); Frank Lange, Büdingen (DE)

(73) Assignee: Norma Germany GmbH, Maintal (DE)

( * ) Notice: Subject to any disclaimer, the term of this patent is extended or adjusted under 35 U.S.C. 154(b) by 119 days.

(21) Appl. No.: 16/614,178

(22) PCT Filed: Apr. 25, 2018

(86) PCT No.: PCT/EP2018/060573
§ 371 (c)(1),
(2) Date: Nov. 15, 2019

(87) PCT Pub. No.: WO2018/210538
PCT Pub. Date: Nov. 22, 2018

(65) Prior Publication Data
US 2020/0173587 A1 Jun. 4, 2020

(30) Foreign Application Priority Data
May 16, 2017 (DE) .......................... 102017110629.4

(51) Int. Cl.
*F16L 33/02* (2006.01)
*F16L 33/03* (2006.01)
(Continued)

(52) U.S. Cl.
CPC ................ *F16L 33/03* (2013.01); *F16L 33/08* (2013.01); *B65D 63/02* (2013.01); *F16B 2/08* (2013.01);
(Continued)

(58) Field of Classification Search
CPC ......... F16L 33/03; F16L 33/08; F16L 33/035; F16L 33/10
See application file for complete search history.

(56) References Cited

U.S. PATENT DOCUMENTS 3,407,448 A * 10/1968 Tetzlaff .................. F16L 33/10
24/19
3,454,996 A * 7/1969 Tetzlaff .................. F16L 33/04
24/283
(Continued)

FOREIGN PATENT DOCUMENTS

DE         10324236 A1    8/2004
DE      102006057497 A1   3/2008
(Continued)

OTHER PUBLICATIONS

Japanese Office Action for Japanese Application No. 2019-563886 dated Dec. 22, 2020 (4 pages).
(Continued)

*Primary Examiner* — Jason W San
(74) *Attorney, Agent, or Firm* — Reising Ethington, P.C.

(57) ABSTRACT

The disclosure relates to a spring clamp, having a clamp band and a positioning device for pre-positioning the spring clamp on a hose end of a hose. The positioning device having a support band and a contact region, and the support band having. The positioner having a fixing means arranged at the end of the support band, and the support band having a retainer at another end of the support band. A web is formed in the support band between the contact region and the positioner. The support band has at least two regions in the region of the positioner, the first region extending from the web away from the clamp band and the second region extending substantially perpendicularly from the first region.

10 Claims, 3 Drawing Sheets

(51) Int. Cl.
*F16L 33/08* (2006.01)
*B65D 63/02* (2006.01)
*F16B 2/08* (2006.01)
*F16L 33/035* (2006.01)
*F16L 33/10* (2006.01)

(52) U.S. Cl.
CPC ............ *F16L 33/035* (2013.01); *F16L 33/10* (2013.01); *F16L 2201/60* (2013.01)

(56) References Cited

U.S. PATENT DOCUMENTS

| | | | | |
|---|---|---|---|---|
| 3,477,106 A * | 11/1969 | Tetzlaff | .................... | F16L 33/02 |
| | | | | 24/279 |
| 7,761,962 B2 * | 7/2010 | Krauss | .................... | F16L 33/08 |
| | | | | 24/279 |
| 7,896,400 B2 * | 3/2011 | Brill | ................. | F02M 35/10321 |
| | | | | 285/23 |
| 7,946,001 B2 * | 5/2011 | Krauss | .................... | F16L 33/08 |
| | | | | 24/19 |
| 8,607,420 B2 * | 12/2013 | De Campos | ............ | F16L 33/08 |
| | | | | 24/274 R |
| 8,607,422 B2 * | 12/2013 | Mohan | .................... | F16L 33/08 |
| | | | | 24/279 |
| 9,541,226 B2 * | 1/2017 | Saunders | ................. | F16L 33/08 |
| 2012/0246882 A1 * | 10/2012 | Mohan | .................. | F02B 29/045 |
| | | | | 24/274 WB |
| 2019/0293216 A1 * | 9/2019 | Leusner | ................... | F16L 33/08 |

FOREIGN PATENT DOCUMENTS

| | | |
|---|---|---|
| DE | 102006048336 A1 | 4/2008 |
| DE | 102006048344 A1 | 4/2008 |
| DE | 102008047038 A1 | 3/2010 |
| DE | 202011005396 U1 | 6/2011 |
| DE | 102012204370 A1 | 10/2012 |
| FR | 2887321 A1 | 12/2006 |
| JP | 2010501797 A | 1/2010 |
| WO | WO2008022853 A1 | 2/2008 |
| WO | WO2014142226 A1 | 2/2017 |

OTHER PUBLICATIONS

English Translation of Japanese Office Action for Japanese Application No. 2019-563886 dated Dec. 22, 2020 (8 pages).
International Search Report for Application No. PCT/EP2018/060573 dated Jul. 5, 2018 (4 pages).
English Translation of International Search Report for Application No. PCT/EP2018/060573 dated Jul. 5, 2018 (3 pages).
German Office Action for Application No. 10 2017 110 629.4 dated Mar. 26, 2018 (8 pages).

\* cited by examiner

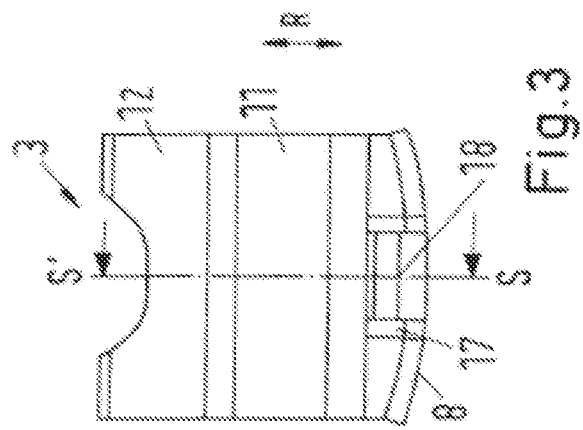
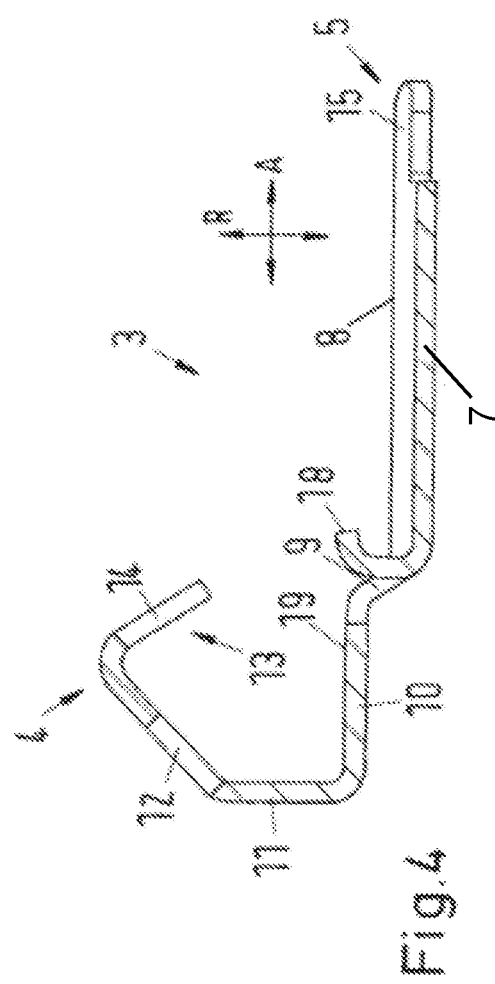
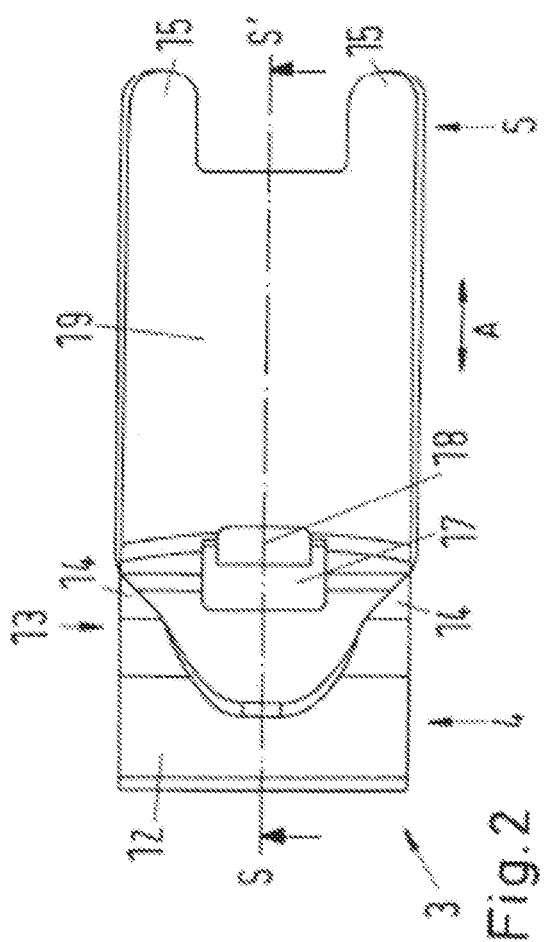

POSITIONING DEVICE FOR A SPRING CLAMP

INTRODUCTION

The disclosure relates to a spring clamp having a clamp band and a positioning device for pre-positioning the spring clamp on a hose end of a hose.

A spring clamp serves, for example, to clamp a hose on a fitting. To that end, a spring clamp is pushed onto a hose and/or a fitting in a pre-tensioned state. In order to produce a tight connection between the hose and the fitting, the pre-tensioning of the spring clamp is released, so that the spring clamp connects the hose to the fitting in a sealed manner by its clamping force. To produce the clamping force of spring clamps, materials having high strengths are chosen, which materials must be provided with a coating for corrosion protection.

Before the spring clamp is released and thus clamped on the assembly of the hose and the fitting, the spring clamp has, for installation thereof, an inside diameter which is larger than the outside diameter of the hose or of the fitting in the installation region.

As a result, the spring clamp cannot be firmly fixed to the provisional assembly of the hose and the fitting before it is finally installed.

DE 10 2006 048 344 A1 describes a hose clamp in which, in order to facilitate preliminary assembly, a positioning arrangement is arranged on an outer side of the clamp band of the hose clamp, which positioning arrangement has a positioner which can be pressed into the hose wall of a hose. The claws which can be pressed into the hose wall are arranged in a circumferential direction of the clamp band. The hose clamp further has a second positioning arrangement which is arranged on the inside of the clamp band and, as well as having axial stops, likewise has claws which can be pressed into the hose wall. The second positioning arrangement extends over a large part of the circumference of the hose clamp.

DE 10 2008 047 038 A1 describes a spring clamp which has a pre-positioning device having a support band which is arranged on the outer side of the spring clamp and can be fixed to the spring clamp by means of a plurality of retainers which engage around the clamp band of the spring clamp. In order to accommodate the various retainers and in order to accommodate the tips provided for fixing the spring clamp, the prior-known positioning device extends over a large part of the circumference of the spring clamp.

The solutions known from the prior art for a positioning device of a clamp have in common that the positioning devices are produced with a comparatively large outlay in terms of material, since the known solutions are multi-part and/or extend over a large part of the circumference of the clamp in question.

SUMMARY

An object underlying the disclosure, according to an embodiment, is to provide a positioning device by means of which a spring clamp can reliably be pre-positioned on a hose end, wherein the positioning device can be produced with a minimal outlay in terms of material and manufacture. Any corrosion-protecting coating of the spring clamp is not to be damaged by the positioning device.

The object is achieved per an embodiment by providing a positioning device for a spring clamp in which a web is formed in the support band between the contact region and the positioner, which web is oriented inwards in a radial direction, with respect to the spring clamp, and the support band has in the region of the positioner at least two regions, wherein the first region adjoins the web in the axial direction away from the clamp band and the second region adjoins the first region substantially perpendicularly.

This produces the advantage, in this embodiment, that the positioner of the positioning device performs two functions, namely that of fixing the spring clamp on the hose end by means of fixing means and that of orienting the spring clamp in the axial direction on the hose end by means of the perpendicular second region. It is thus advantageously possible, according to an embodiment, to configure the positioning device with a support band that is narrow in the circumferential direction, because all the elements of the positioning device can be arranged one behind the other in the axial direction along the support band. A positioning device can thereby be combined with different nominal diameters of the spring clamp. Depending on the nominal diameter of the spring clamp, the positioning device then rests with either its whole surface or at least a portion of its surface on the outer side of the clamp band. In any case, a coating on the outer side of the clamp band is not or is only slightly stressed.

It may therefore be advantageous according to an embodiment that the support band has a smaller extent in a circumferential direction of the spring clamp than it has in the axial direction. In this manner, the support band can be produced in a material-saving manner. In particular, the support band can be produced by stamping and/or shaping a strip. The support band can be preferably made of metal, particularly preferably of a corrosion-resistant metal. The corrosion resistance can preferably be derived from the material properties of the metal and can preferably be achieved by coating the metal. Providing a positioning device made of metal produces the advantage, according to an embodiment, that the support band can readily be produced by means of stamping and/or shaping. In addition, the provision of a corrosion-resistant metal produces the advantage, according to an embodiment, that the spring clamp having the positioning device can also be used in corrosive environments.

In an embodiment, it may be preferably provided that the web, the positioner and the retainer lie axially outside the spring clamp. This may be a particularly advantageous further development of the positioning device, per an embodiment, since these elements serve to secure the positioning device on the spring clamp and to secure the spring clamp having the positioning device on the hose end. In an embodiment, the position of the web and of the retainer outside the clamp band may be advantageous since the web and the retainer thus reach around the clamp band in the radial direction coming from outside, and thus arrange the positioning device on the clamp band without the web and the retainer being located between the hose end and the inner side of the clamp band. This may be advantageous because the pressing force of the clamp band on the hose end is thereby particularly even. The even pressing force increases the reliability and thus the tightness of the connection, since no regions of the hose end and/or of the spring clamp are stressed particularly greatly and could thereby fail under mechanical stress.

It is provided according to an embodiment that the web rests laterally on the clamp band. This produces that the positioning device can be clamped on the clamp band by means of the web. In addition, as a result of the contact of the web, twisting of the positioning device against the axial direction of the spring clamp may be prevented. Contact of the web with the clamp band ensures that the support band and the clamp band are always substantially perpendicular to one another.

An embodiment provides that at least one notch is provided in the region of the web, wherein, as a result of the notch, a clamping tab can be bent out of the support band in the direction towards the clamp band. By bending a part from a notch of the support band, which forms the web, wherein the notch is formed in the region of the web, the positioning unit can reliably be arranged on the clamp band in such a manner that it is secured against being lost. This is the case in particular when the clamping tab is bent in the direction towards the clamp band and reaches around the clamp band in the radial direction. The notch is in the form of a punched-out region, according to an embodiment, which is located in the web and extends in an inverted U-shape from the side of the web which adjoins the contact region of the support band.

It is further provided in an embodiment that the clamping tab engages around the clamp band at least in part in a radial direction. The partial engagement of the clamping tab around the clamp band in the radial direction produces that the security of the positioning device against being lost from the clamp band is increased.

A further embodiment provides that the contact region has a bend in a circumferential direction of the spring clamp. Preferably, the bend in the contact region corresponds substantially to the bend of the clamp band on its outer side. In an embodiment, the bending radius of the support band, with respect to the spring clamp, on its inner side corresponds to the bending radius of the outer side of the clamp band. This produces that the support band rests with its whole surface on the clamp band. As a result of the whole-surface contact, the fixing and retaining forces which arise on the one hand through the fixing of the positioning device on the hose end and on the other hand through the clamping of the spring clamp on the hose are evenly absorbed and ideally distributed over the positioning device.

It is provided according to an embodiment that the positioner has a third region which has a shorter extent along the support band than does the first region of the positioner. The fact that the third region has a shorter extent than does the first region produces the that the third region and the fixing means cannot project in the axial direction into the inner region of the spring clamp. Clamping of the hose, for example, on a fitting is thus not impaired by the third region of the positioner.

A further embodiment provides that the third region of the positioner encloses on an inner side of the support band an obtuse or right angle with the second region of the positioner. This produces that the hose end is enclosed by the positioner in a further direction. Reliable positioning and/or fixing of the spring clamp on a hose is thus provided.

A further embodiment provides that the third region of the positioner can be bent around a hose end of a hose, and the second region of the positioner thereby rests in the axial direction on the hose end of the hose. As a result of this, the positioner engages around the hose end completely.

It is provided according to an embodiment that the fixing means is arranged in the end region of the support band opposite the retainer. As a result of this arrangement, the positioning device having the positioner is arranged in the end region of the hose. The positioner can thereby be so arranged that, for positioning the spring clamp on the hose end, it engages around the hose end at least in part. On the other side of the positioning device in the axial direction there is located only the retainer, which serves to connect the positioning device to the clamp band. The retainer is thus not involved in positioning the spring clamp on the hose end. The spring clamp can thus be arranged and ultimately also positioned conveniently on the hose end.

It is provided according to an embodiment that the retainer engages around the clamp band of the spring clamp at least in part in a radial direction with respect to the spring clamp. This produces that the security of the positioning device against being lost from the clamp band in the uninstalled state of the spring clamp is increased. In the installed state of the spring clamp, the fixing and holding forces which arise on the one hand through the fixing of the positioning device on the hose end and on the other hand through the clamping of the spring clamp on the hose are absorbed by the partial engagement of the retainer around the clamp band in the radial direction.

It is provided according to an embodiment that the retainer has at least one retaining tab which is in the form of a shaping of the support band. By providing at least one retaining tab in the form of a shaping of the clamp band, material can be saved. Two retaining tabs are preferably provided. This produces that, by means of the retaining tabs, the positioning device against twisting of the spring clamp is given.

BRIEF DESCRIPTION OF THE FIGURES

Further features, details and advantages of the disclosure will become apparent from the wording of the claims and also from the following description of embodiments with reference to the drawings, in which:

FIG. 2 is a top view, in a schematic representation, of the positioning device, FIG. 3 is a schematic representation of a side view of the positioning device, and FIG. 4 is a schematic representation of a section in the axial direction along the plane S-S' through the positioning device.

DETAILED DESCRIPTION

Figure 1:
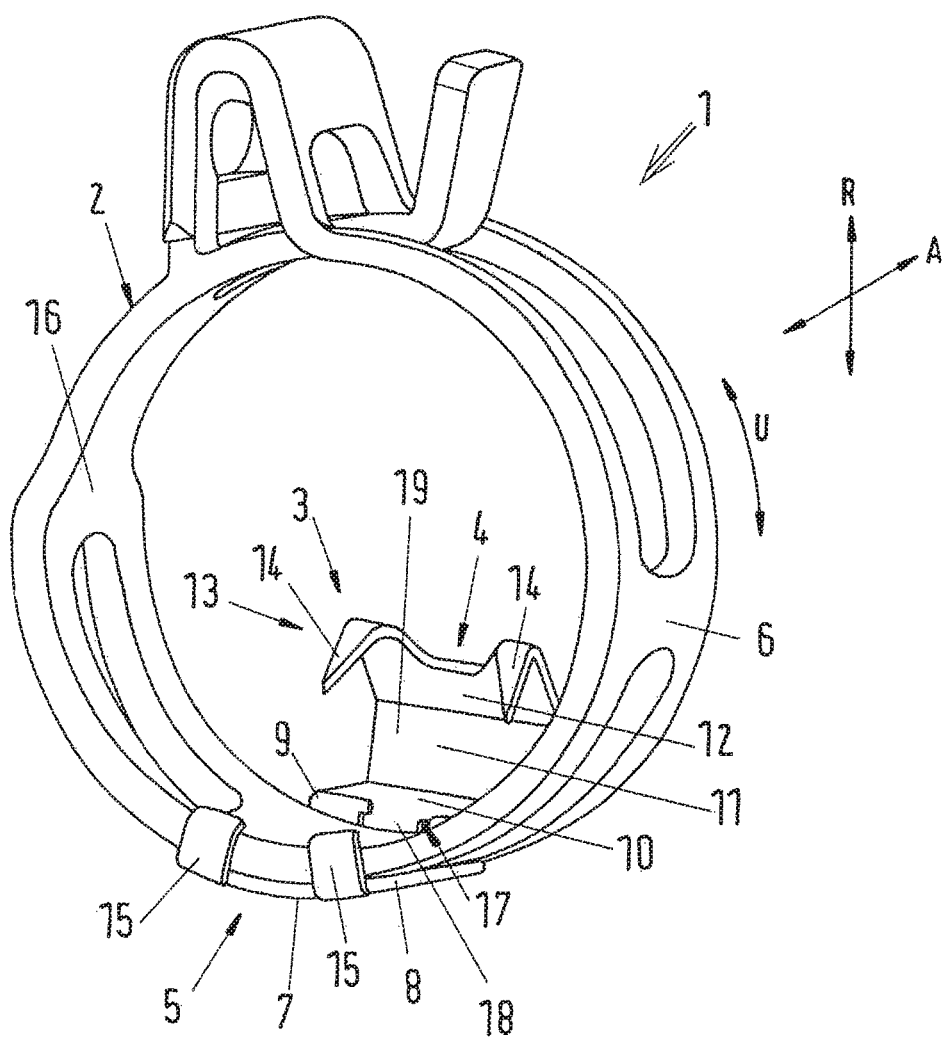
FIG. 1 is a perspective representation of a spring clamp having a positioning device.

All the elements described hereinbelow relate in each case to all the figures, wherein the reference signs for designating the elements are used consistently over all the figures. FIG. 1 shows an embodiment of an assembly of a spring clamp 1 having a clamp band 2 and a positioning device 3. FIGS. 2 to 4 show different views of the positioning device 3.

The positioning device 3 has, in an axial direction A of the spring clamp 1, on one side of the spring clamp 1 a positioner 4 and on the other side a retainer 5. The positioning device 3 is arranged on an outer side 6 of the clamp band 2 of the spring clamp 1 and is formed of a support band 7. The positioning device 3 has a contact region 8 in the portion of the support band 7 that rests against the outer side 6 of the clamp band 2 of the spring clamp 1.

The support band 7 extends in an axial direction A, with respect to the spring clamp 1. The support band 7 is described hereinbelow starting from one end along the axial direction A. At one end of the support band 7 there is arranged the retainer 5. The retainer 5 is followed by the contact region 8. The support band 7 further has, when seen in the axial direction A, a web 9. The web 9 is followed by the positioner 4, which extends to the end of the support band 7 that is opposite the retainer 5. The positioner 4 has a first region 10, which adjoins the web 9. Along the support band 7 there further follow, as part of the positioner 4, a second region 11 and a third region 12. A fixing means 13 is further located at the end of the positioner 4, and thus at the end of the support band 7, that is opposite the retainer 5.

The contact region 8 has in a circumferential direction U of the spring clamp 1 a curvature which corresponds substantially to the curvature of the outer side 6 of the spring clamp 1 in the circumferential direction U. Moreover, the retainer 5 likewise has a curvature in the circumferential direction U which corresponds to the curvature of the contact region 8. The web 9 likewise has, on the side at which the web 9 adjoins the contact region 8, the curvature of the contact region 8. The web 9 does not have a curvature on the side at which the web 9 adjoins the positioner 4. The positioner 4 does not have a curvature in the circumferential direction U of the spring clamp 1.

The positioning device 3 has a web 9 on the side of the clamp band 2 of the spring clamp 1 that is opposite the retainer 5, between the contact region 8 and the positioner 4. The web 9 extends inwards in a radial direction R, with respect to the spring clamp 1, from the contact region 8 of the positioning device 3. The contact region 8 and the web 9 thereby enclose an obtuse angle or a right angle on their radially inner sides. The web 9 is located outside the spring clamp 1 in the axial direction A. In the radial direction R, the web 9 extends inwards, with respect to the spring clamp 1.

The positioning device 3 further has a first region 10 which directly adjoins the web 9. The first region 10 is oriented substantially parallel to the contact region 8 and lies outside the spring clamp 1 in the axial direction A. The first region 10 thus lies, when seen in a radial direction R, with respect to the spring clamp 1, further inwards than the contact region 8 of the positioning device 3.

The first region 10 of the positioner 4 is followed by a second region 11 of the positioner 4, which is substantially perpendicular to the first region 10. The second region 11 extends inwards in the radial direction R with respect to the spring clamp.

The second region 11 of the positioner 4 is followed by a third region 12 of the positioner 4. The second region 11 and the third region 12 of the positioner 4 enclose an obtuse angle or a right angle on their side facing the spring clamp 1. The third region 12 of the positioner 4 is arranged outside the spring clamp 1, with respect to the axial direction A of the spring clamp 1. In addition, the third region 12 of the positioner 4 has a shorter extent along the support band 7 than does the first region 10 of the positioner 4.

The third region 12 of the positioner 4 is followed by a fixing means 13, as part of the positioner. The fixing means 13 has at least one tip 14. The fixing means 13 is substantially perpendicular to the third region 12 of the positioner 4. The fixing means 13 is located, with respect to the spring clamp 1, outside the spring clamp 1 in the axial direction A and, when seen in an axial direction A, at the end of the support band 7 that is opposite the retainer 5.

In the radial direction R with respect to the spring clamp 1, the web 9 extends from the contact region 8 so far inwards that the inner side 16 of the clamp band 2 of the spring clamp 1 and the radially inwardly facing side of the support band 7 are approximately at the same height in the first region 10 of the positioner 4.

The extent of the second region 11 of the positioner 4 inwards corresponds, likewise with respect to the radial direction R of the spring clamp 1, approximately to the wall thickness of the lateral surface of the hose in the region of the hose end.

The third region 12 of the positioner 4 can be bent outwards in the radial direction R about its contact line with the second region 11, so that the third region 12 of the positioner 4 and the first region 10 of the positioner 4 can be brought into a position relative to one another in which the first region 10 of the positioner 4 and the third region 12 of the positioner 4 are parallel to one another. The at least one tip 14 of the fixing means 13 of the positioner 4 extends over a length which is smaller than or equal to the extent of the second region 11 of the positioner 4 along the support band 7.

The at least one tip 14 is in such a form that, by bending the third part 12 of the positioner 4 in the radial direction R, outwards as seen with respect to the spring clamp 1, it can be introduced into a wall of a hose. In the case of a tip 14 introduced into a hose wall, the angle enclosed between the inner sides of the second region 11 and of the third region 12 is a right angle.

The fixing means 13 has two tips 14, each of which has an acute angle at the end of the support band 7 opposite the retainer 5. Perpendicular to the axial direction A, the support band 7 has a radius between the tips 14 of the fixing means 13. The angle enclosed between the fixing means 13 and the third region 12 is an acute angle or a right angle.

The sum of the angle that is enclosed between the second region 11 and the third region 12 and the angle that is enclosed between the third region 12 and the fixing means 13 is 180°.

The second region 11 of the positioner 4 can thereby be so arranged with the hose that the second region 11 rests axially on a hose end in the region of the hose wall. The extent of the second region 11 corresponds to the wall thickness of the hose.

The retainer 5 has at least one, in particular two retaining tab(s) 15. Each retaining tab 15 can be arranged, when seen in the circumferential direction U of the spring clamp 1, in the outer region of the support band 7 and can directly adjoin the contact region 8 of the positioning device 3.

Each retaining tab 15 is substantially perpendicular to the contact region 8 of the positioning device 3 extends the radial direction R on the clamp band 2 of the spring clamp 1. Each retaining tab engages around the clamp band 2 of the spring clamp.

The web 9 has a partial notch 17 which extends from the contact region in an inverted U shape. The clamping tab 18 freed by the notch 17 is inclined in the axial direction A from the web 9 of the positioner 4 towards the clamp band 2. The clamping tab 18 rests on the clamp band and extends in the radial direction. The clamping tab 18 engages around the clamp band and reaches onto the inner side of the clamp band of the spring clamp. The notch 17 is in the form of a punched-out region in the web 9.

The support band 7 comprises all the regions of the positioning device 3, namely the retainer 5, the contact region 8 and the positioner 4. The positioning device 3 can be produced integrally and from a metal strip, which forms the support band 7, by stamping and shaping.

Figure 5:
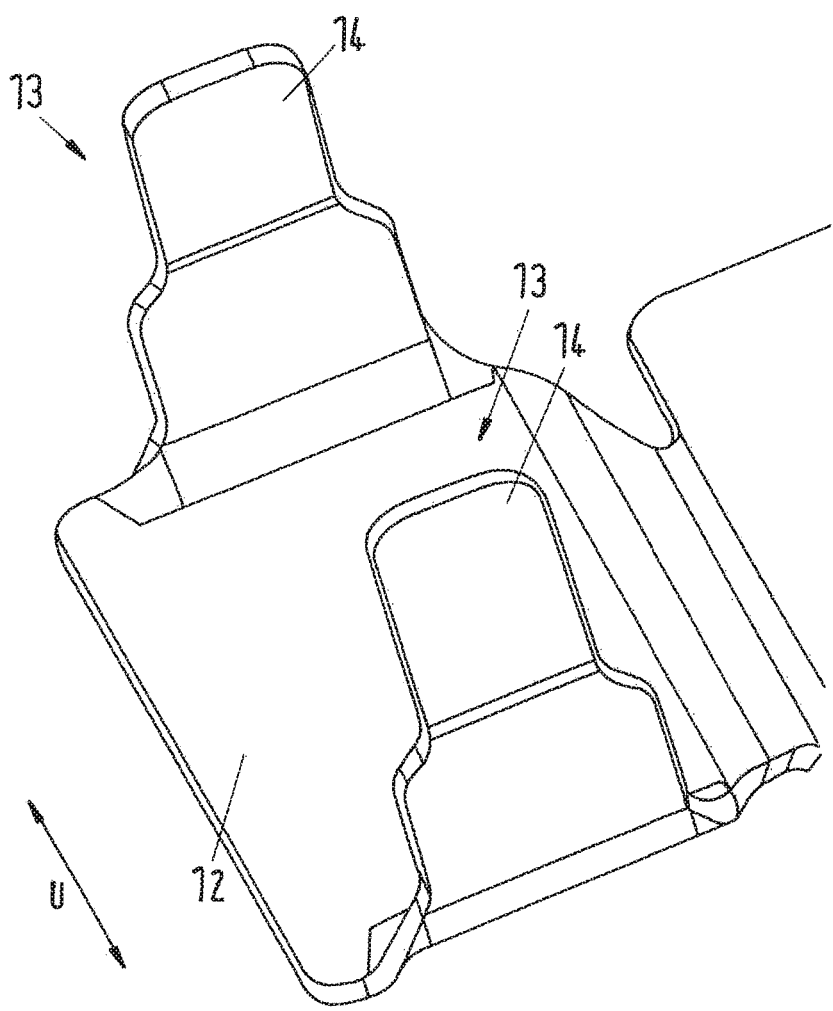
FIG. 5 is a schematic, perspective detail representation of the fixing means of an alternative form of the positioning device.

In an alternative form according to FIG. 5, the fixing means 13 is attached laterally to the third region 12 in the circumferential direction U. A tip 14, which is arranged substantially perpendicular to the third region 12, is hereby located in the circumferential direction U on each side. The tips 14 are here in the form of tabs. Alternatively, the tips 14 have an acute angle in a portion opposite the third region 12 (not shown).

The invention is not limited to one of the embodiments described above but can be modified in many different ways. For example, the positioning device can also be in the form of a clip which can be combined with different spring clamps.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

1 spring clamp
2 clamp band
3 positioning device
4 positioner
5 retainer
6 outer side of the clamp band
7 support band
8 contact region
9 web
10 first region of the positioner
11 second region of the positioner
12 third region of the positioner
13 fixing means
14 tip
15 retaining tab
16 inner side of the clamp band
17 notch
18 clamping tab A axial direction
R radial direction
U circumferential direction

The invention claimed is:

1. A spring clamp comprising a clamp band and a positioning device pre-positioning the spring clamp on a hose end of a hose, wherein the positioning device comprises a support band, a contact region of which rests against an outer side of the clamp band, and the support band has on one side, in an axial direction (A) with respect to the spring clamp, a positioner having a fixing means arranged at the end of the support band and has at another end of the support band a retainer, wherein a web is formed in the support band between the contact region and the positioner, which web is oriented inwardly in a radial direction (R), with respect to the spring clamp, and the support band has in the region of the positioner at least two regions, wherein the first region adjoins the web in the axial direction (A) away from the clamp band and the second region adjoins the first region substantially perpendicularly, wherein at least one notch is provided in the region of the web, wherein as a result of the notch a clamping tab can be bent from the support band in the direction towards the clamp band, wherein the clamping tab engages at least in part around the clamp band in a radial direction (R).

2. The spring clamp as claimed in claim 1, wherein the support band has a smaller extent in a circumferential direction (U) of the spring clamp than in the axial direction (A).

3. The spring clamp as claimed in claim 1, wherein the web, the positioner and the retainer lie axially outside the spring clamp.

4. The spring clamp as claimed in claim 1, wherein the web rests laterally on the clamp band.

5. The spring clamp as claimed in claim 1, wherein the contact region has a bend in a circumferential direction (U) of the spring clamp.

6. The spring clamp as claimed in claim 1, wherein the positioner has a third region which has a shorter extent along the support band than does the first region of the positioner.

7. The spring clamp as claimed in claim 6, wherein the third region of the positioner encloses on an inner side of the support band an obtuse or right angle with the second region of the positioner.

8. The spring clamp as claimed in claim 7, wherein the third region of the positioner can be bent around a hose end of a hose, and the second region of the positioner thereby rests in the axial direction (A) on the hose end of the hose.

9. The spring clamp as claimed in claim 1, wherein the retainer engages at least in part around the clamp band of the spring clamp in a radial direction (R), with respect to the spring clamp.

10. The spring clamp as claimed in claim 1, wherein the retainer has at least one retaining tab which is in the form of a shaping of the support band.

* * * * *